(12) United States Patent
Müller

(10) Patent No.: US 6,559,278 B1
(45) Date of Patent: May 6, 2003

(54) METHOD FOR PRODUCING TETRAHYDROFURAN POLYMERS

(76) Inventor: Herbert Müller, Carostrasse 53, 67227 Frankenthal (DE)

( * ) Notice: Subject to any disclaimer, the term of this patent is extended or adjusted under 35 U.S.C. 154(b) by 0 days.

(21) Appl. No.: 09/806,541

(22) PCT Filed: Oct. 7, 1998

(86) PCT No.: PCT/EP98/06370
§ 371 (c)(1),
(2), (4) Date: Mar. 30, 2001

(87) PCT Pub. No.: WO00/20485
PCT Pub. Date: Apr. 13, 2000

(30) Foreign Application Priority Data

Apr. 8, 1997 (DE) .......................................... 197 14 418

(51) Int. Cl.[7] .......................... C08F 6/06; C08G 65/20; C08G 65/16
(52) U.S. Cl. ....................... 528/486; 528/403; 528/408; 568/617; 560/240
(58) Field of Search ................................ 528/486, 403, 528/408, 416; 568/617; 560/240

(56) References Cited

U.S. PATENT DOCUMENTS 5,208,385 A  5/1993  Kahn et al.
5,210,283 A  5/1993  Kahn et al.

FOREIGN PATENT DOCUMENTS

| EP | 0 239 787 A | 10/1987 |
| WO | 94 05719 A | 3/1994 |
| WO | 96 23833 A | 8/1996 |

*Primary Examiner*—Duc Truong
(74) *Attorney, Agent, or Firm*—Fulbright & Jaworski L.L.P.

(57) ABSTRACT

The invention relates to a method for continuously or discontinuously producing tetrahydrofuran polymers by homopolymerization of tetrahydrofuran, alkyl-substituted tetrahydrofurans and/or alkylene oxides in the presence of carboxylic acid anhydrides or compounds containing reactive hydrogen using an optionally non-acidified or acid-activated calcined and granular natural amorphous aluminum silicate catalyst. The inventive method provides a means for substantially suppressing the formation of cyclic ethers and for obtaining a polymer with a narrow molecular weight distribution by keeping the concentration of carboxylic acid anhydrides or alkylene oxide constantly below 1 wt. % during polymerization. The catalysts have a long life span and lead to polymers that are characterized by highly uniform properties and a narrow molecular weight distribution even if a fairly impure monomer is used. The catalysts are characterized in their granulated form by a previously unknown activity and they form polymers having a very narrow molecular weight distribution and very low color index and acid number.

22 Claims, 1 Drawing Sheet

METHOD FOR PRODUCING TETRAHYDROFURAN POLYMERS

The present relation relates to a method for discontinuously or continuously producing tetrahydrofuran polymers by homopolymerization of tetrahydrofuran (THF) or copolymerization of tetrahydrofuran with alkyl-substituted tetrahydrofurans and/or 1,2-alkylene oxides using non-acidified or acid-activated and calcined aluminum silicate, whereby homopolymers and copolymers are obtained which have a particularly narrow molecular weight distribution, contain a negligible amount of oligomeric cyclic ether contaminants and have a low color index and acid number.

The catalytic synthesis of tetrahydrofuran polymers on aluminum silicates has been known for a long time. British patent No. 845 948 describes a process for copolymerizing tetrahydrofuran with alkylene oxides, in which the polymerization is carried out in the presence of compounds containing reactive hydrogen, using bleaching-earth catalysts. In this process, relatively large amounts of low-molecular products consisting predominantly of oligomeric cyclic ethers are obtained as byproducts. The molecular weight distribution of the tetrahydrofuran polymers is very broad. Depending on the average molecular weight, it can correspond to a heterogeneity quotient $M_w/M_n$ of 3 to 4 for the molecular weight range from 1000 to 2000 ($M_w$=weight-average molecular weight; $M_n$=number-average molecular weight). The polymers are altogether yellowish in color, are for the most part not strictly bifunctional, and have a high acid number (usually >0.1 mg KOH/g) which makes them unsuitable for further processing to polyesters and polyurethanes. An improved process is described in the PCT application WO 96/23833. Here, the use of acid-treated, calcined synthetic amorphous aluminum silicates, kaolin or zeolites is suggested for homo- and copolymerizing tetrahydrofuran. The polymers obtained in this way, especially the copolymers, show a significant deviation of more than 1–2% from strict bifunctionality, and thus have only limited suitability as soft-segment diol components of, for example, spandex fibers. In particular, the activity of these catalysts is not constant, but fluctuates from batch to batch. Despite their low price, this poses a serious disadvantage with regard to the commercial use of these catalysts. A further disadvantage is that only extremely pure THF produces usable polymers.

The homopolymerization of tetrahydrofuran by means of oxonium ion catalysis became known as the result of fundamental work done by H. Meerwein et al. (Angew. Chemie 72, (1960), 927), and is dealt with comprehensively in the monograph "Polytetrahydrofuran" by P. Dreyfuβ, Gordon and Breach Sc. Publishers, New York, London, Paris 1982. The German published examined application No. 1226560 describes the homopolymerization of tetrahydrofuran to polyoxybutylene glycol diacetates using montmorillonite catalysts. Powdered catalysts prove superior to granular ones (cf. column 4, lines 34–36). This process, however, results in products which, on account of their poor color, just to give one reason, require costly purification if they are to be processed further. These problems are described in the unexamined German laid open patent application No. 3935750.

Oligomeric cyclic ethers formed during the homo- and copolymerization reactions constitute undesirable impurities in the polymers, since they represent inert material and lower the quality of the final polymers made from polymeric glycols. Various suggestions for reducing their content have already been made. For example, it is suggested in the EP-A 6107 that the copolymers could be treated at an elevated temperature with an activated montmorillonite. In U.S. Pat. No. 4,127,513 it is suggested to use a specially activated montmorillonite as catalyst. Disadvandageously of this process are high color indices of the polymers, a relatively slow rate of polymerization and an oligomeric cyclic ether content which is still as high as 5 to 6 wt. %.

A further proposal for improving the copolymerization of alkylene oxides with tetrahydrofuran under the catalytic influence of activated bleaching earth is to be found in the U.S. Pat. No. 4,228,272, which describes the use of bleaching earths with a given specific pore volume, a defined catalytic surface area and a given pore diameter. The oligomer content of 4 wt. % (cf. column 5, lines 14–15) is, however, still too high to permit use of the copolymers for the production of polyurethanes, which have to satisfy special mechanical demands.

As is known, all processes for copolymerizing alkylene oxides with tetrahydrofuran in the presence of bleaching earths result in high-molecular-weight polymers with terminal hydroxyl groups. The latter are always contaminated with a variable proportion of macrocyclic ethers without hydroxyl groups. Hence it has also been suggested that the cyclic ethers should be removed by way of extraction with hydrocarbons, water or supercritical gases (U.S. Pat. Nos. 4,500,705, 4,251,654 and 4,306,056).

According to the teaching of the EP-A-104 462, moreover, the formation of cyclic ethers is for the most part an inevitable side reaction of the cationic ring opening polymerization, and is little influenced by the catalyst used. Accordingly, one would not have assumed that the choice of a specific catalyst would suppress the formation of cyclic ethers.

All catalysts described so far have the disadvantage that their life span depends heavily on the purity of the tetrahydrofuran used. In particular, their life span is reduced considerably if tetrahydrofuran is contaminated with even low concentrations, e.g., 2 to 10 ppm of carbonyl compounds such as esters, ketones or aldehydes. In the processes described until now, a poor-quality monomer of this kind, as it is obtained, for example, from the decarbonylation and subsequent hydrogenation of furfural or the hydrogenation of maleic anhydride, must always be subjected to tedious refining so that the catalyst's life span is not shortened.

The unexamined German laid open patent application 3 346 136 describes a process for the copolymerization of alkylene oxides and tetrahydrofuran, in which the formation of cyclic oligomeric ethers is prevented from exceeding 2 wt. % by polymerizing continuously in a reactor and adding to the circulating reaction mixture less than 30 wt. % of fresh feed comprising tetrahydrofuran and 1,2-alkylene oxide. The disadvantage of this process is that the resulting polymers have a broad molecular weight distribution, with a heterogeneity quotient $M_w/M_n$ in excess of 4.

From the EP-A-O 104 609 it is known that diesters of polyoxybutylen oxy—alkylene glycol diester with a low content of oligomeric cyclic ethers are obtained if the copolymerization of tetrahydrofuran and a 1,2-alkylene oxide is carried out in the presence of carboxylic acid anhydride and bleaching earth with a water content of less than 3 wt. %. However, in this process too, the molecular weight distribution of the copolymers is not sufficiently narrow. Recently, two other methods of polymerizing with bleaching earths or amorphous aluminum silicates (U.S. Pat. Nos. 5,208,385 and 5,210,283) have been published but are not satisfactory either. Only very heterogeneous polymers are obtained, which have the further disadvantages of being colored and having acid numbers >0.1 mg KOH/g.

The EP-A-0 239 787 contains a proposal for narrowly limiting the molecular weight distribution and reducing the formation of oligomeric cyclic ethers by means of a discontinuous copolymerization on bleaching earth catalysts in the presence of telogenes containing reactive hydrogen and a constant but low concentration of 1,2-alkylene oxide.

Nevertheless, there is still a need to reduce the molecular weight distribution of both homo- and copolymers to a value lower than 1.3 to 2.5 for molecular weights between 1000 and 2000, for example to a value between 1.1 and 2.0, and to limit the formation of oligomeric cyclic ethers to less than 1 wt. %. Methods are needed whereby low-molecular polymers with an average molecular weight of less than 200 are not formed at all, or at the most to an extent of 1 wt. %. An additional purification step to remove these products, as is required with the processes currently in use, would then be unnecessary.

Thus, the object of the present invention was to provide a method for producing high-quality polymers and copolymers from tetrahydrofuran and alkylene oxide and/or alkyl-substituted tetrahydrofurans, in which the formation of significant amounts of oligomeric cyclic ethers is avoided and colorless polymers or copolymers are obtained which have a narrow molecular weight distribution $M_w/M_n$ of about 1.1 to 2.0 for molecular weights in the range from 1000 to 2000, and which have a low acid number.

This object is established according to the invention by a method for continuously or discontinuously producing tetrahydrofuran polymers by polymerization of THF and/or substituted tetrahydrofurans or copolymerization of THF and/or substituted tetrahydrofurans with alkylene oxides, using allophane clays as catalyst and controlling the concentration of reactants as explained below.

According to a first aspect, this invention relates to a method for discontinuously or continuously producing diesters of polytetramethylene ether glycol by polymerization of tetrahydrofuran and/or substituted tetrahydrofurans in the presence of carboxylic acid anhydride and a catalyst, wherein the catalyst is a non-acidified or protonated and calcined natural amorphous aluminum silicate catalyst and the carboxylic acid anhydride is added to the reaction mixture in such a manner that its concentration therein is kept below 1 wt. % during the polymerization reaction.

According to a second aspect, this invention relates to a method for discontinuously or continuously producing derivatives of polyoxybutylen oxyalkylene glycol diester by copolymerization of tetrahydrofuran and/or substituted tetrahydrofurans with alkylene oxides in the presence of compounds containing reactive hydrogen and of a catalyst, the method being characterized in that the catalyst is a non-acidified or protonated and calcined natural amorphous aluminum silicate catalyst, and that the alkylene oxide is added to the reaction mixture in such a manner that its concentration therein is kept below 1 wt. % during the polymerization reaction.

Suitable substituted tetrahydrofurans are, for example, tetrahydrofurans substituted in the 2- or 3- position. Examples of substituents include, aryl groups, linear or branched alkyl groups or alkoxy substituents. It is preferable to use 3-methyl tetrahydrofuran. Substituted tetrahydrofurans are generally used in amounts of about 0.5 to 20 wt. % relative to the THF. They may be used as pure substances or as mixtures.

Suitable alkylene oxides are substituted or unsubstituted alkylene oxides. Examples of substituents include linear or branched alkyl groups having 1 to 6, or preferably 1 to 2 carbon atoms, phenyl groups, phenyl groups substituted with alkyl and/or alkoxy groups having 1 to 2 C atoms or with halogen atoms, or halogen atoms, preferably chlorine atoms. Particularly suitable alkylene oxides are 1,2-butylene oxide, 2,3 butylene oxide, styrene oxide, epichlorohydrin and, preferably, ethylene oxide and 1,2 propylene oxide. The total amount of alkylene oxides used is calculated such that the concentration thereof is less than 1 wt. % and the molar ratio THF:alkylene oxide is 50:1 to 1:1, preferably 30:1 to 5:1.

Suitable carboxylic acid anhydrides are derived from aliphatic or aromatic carboxylic acids having, for example, 2 to 8 carbon atoms. Examples include acetic anhydride, butyric anhydride, acrylic anhydride and phthalic anhydride. The total amount of carboxylic acid anhydrides used constitutes 0.1 to 50, preferably 0.5 to 20 mol % relative to THF and substituted THF, and the concentration in the reaction mixture is kept below 1 wt. %.

Examples of telogenes containing reactive hydrogen are water, mono- or polyhydric alcohols such as methanol, ethanol, propanol, ethylene glycol, butylene glycol, glycerol, neopentyl glycol and 1,4-butandiol, and also—in particular—carboxylic acids with 1 to 12, preferably 1 to 8 carbon atoms. Polytetramethylene ether glycol (PTMEG) can also be used as compound containing reactive hydrogen for the copolymerization. The total amount of compound containing reactive hydrogen used generally constitutes up to 20 mol %, frequently from 0.01 to 10, for example 0.03 to 3 mol % relative to THF and substituted THF.

The process is most simply and economically carried out by using acetic anhydride for homopolymerization of THF or copolymerization of THF and substituted tetrahydrofurans, and water for copolymerization with alkylene oxides.

Water and polyhydric alcohols result in the formation of polyether alcohols which can have two or more functional groups. Since polymeric semiesters are obtained when carboxylic acids are used, the copolymers containing ester groups are saponified in the usual manner. This applies likewise to homopolymers with ester groups. Saponification is effected, for example, by heating the homo- or copolymers—with or without inert solvents—with aqueous alkali hydroxides. A more effective method is transesterification, for example with methanol, under the catalytic influence of an alkali alcoholate. Such methods have been described in the U.S. Pat. No. 2,499,725 and in J. Am. Soc. Vol. 70, p. 1842.

The allophane clays to be used according to the invention as catalysts are naturally occurring, amorphous, hydrous, acid-labile alum earth silicates with the formula $x—Al_2O_3.ySiO_2.zH_2O$, where the ratio x:y is in the range from about 1:1 to 1:14, and the water content fluctuates between about 10 and 55 wt. %. Allophane clays are the weathered products of alum earth silicates. They constitute the main components of clayish ploughland and are used primarily as special-purpose refractory linings in furnaces and blast furnaces. Pure allophane (allophanite) is coarse in various forms and as a coating, and is opalescent in appearance. The mineral is brittle and either colorless or in different colors. It has a density of 1.9 and a hardness of about 3. As weathered products of silicate rock. allophanes constitute the main components of clayish soils, e.g. loess soils, from which the catalysts of the invention can also be prepared. Allophanes are thus of ubiquitous occurrence and are cheap to obtain.

Compared to naturally-occurring bleaching earths, kaolin and synthetic amorphous aluminum silicates of the type described in PCT application WO 96/23833, the catalysts according to the invention, i.e. natural amorphous aluminum silicates (allophanes), have the distinct advantage that their catalytic activity can be adjusted as required by controlling the production process. Aluminum silicates have acidic centers at their surfaces. The strength of these acidic centers determines the activity and selectivity of the catalyst. The catalyst's activity and selectivity can be controlled during the production process. Brönstedt and Lewis acids are acidic centers which are formed—preferably after treatment with $NH_4CL$ solutions and calcining—in keeping with equations (1) and (2).

$$NH_4AlO2.nSiO_2 \rightarrow NH_3 + HAlO_2.nSiO_2 \qquad (1)$$

$$2\, HAlO_2.nSiO_2 \rightarrow H_2O + Al_2O_3.nSiO_2 \qquad (2)$$

Acidic centers can also be obtained by treatment with organic or inorganic acids, for example formic acid, acetic acid, benzoic acid, acrylic acid, diluted hydrochloric acid, sulfuric acid, nitric acid or phosphoric acid, and subsequent washing with water.

Unlike the synthetic amorphous aluminum silicates described in PCT application WO 96/23833, the catalysts according to the invention are active polymerization catalysts even without acid treatment. In contrast to the acid-activated catalysts, they are neutral to slightly basic in reaction and are thus not corrosive.

It is preferable if the catalysts of the invention are in the solid-state form, for example in granular form or in the form of molded particles. Typically, such granules or molded particles have a mean diameter of 0.5 to 10, preferably 1 to 8 mm.

To make molded catalyst particles for the method of the invention, the non-acidactivated or acid-activated powdered catalyst can be stirred to a paste with water, extruded to pellets or worked into beads with a diameter, for example, of 4 mm in a bead-forming machine. The particles are then heat treated (calcined) to reinforce their structure, dry them and eventually maybe remove ammonium ions in Bronsted acids according to the equation $NH_4AlO_2.SiO_2 \rightarrow NH_3 + HAlO_2.SiO_2$.

The process of the invention is carried out continuously or discontinuously, preferably using solid-state catalysts. In order to ensure that the mixture of substituted and/or unsubstituted tetrahydrofuran, alkylene oxide and the compound containing active hydrogen or of substituted and/or unsubstituted tetrahydrofuran and carboxylic acid anhydride comes into close contact with the catalyst, either the solid-state catalyst is moved in the starting components or else the reaction mixture is kept moving over the fixed-bed catalyst.

In the first case, use is made, for example, of vessels with an agitating means, in which the catalyst granules are suspended. In the second case, for example, the mixture of reaction components is passed over the fixed-bed catalyst. The latter procedure is preferred for various reasons; for one, e.g., the temperature can be controlled more accurately, for another, one obtains a reaction product which is free of catalyst.

The catalyst, in the form of molded particles, is introduced—for example simply by pouring—into a reactor in which it forms a fixed bed through which the reaction mixture flows. The catalyst bed does not need renewing even after extensive use, since the molded catalyst particles do not undergo any abrasion and retain their original solid shape. The catalysts have the advantage that activity loss is low and they have an almost unlimited life span.

Suitable reactors for the process according to the invention include, for instance, columnar reaction vessels, wherein the tube diameter is about 10 to 100 mm if the heat of reaction is to be dissipated. If the temperature is to be regulated by means of a heat exchanger incorporated in an external circuit, it is also possible to use a shaft furnace as reactor.

The mixture of starting reagents is made to flow through the reactor, for example by means of a recirculating pump. The concentration of alkylene oxide or of carboxylic anhydride in the reaction mixture is kept below 1 wt. %, preferably between 0.1 and 0.8 wt. % and even more preferably between 0.1 and 0.5 wt. % during polymerization. At the same time, steps are taken to ensure that the concentration of alkylene oxide or carboxylic anhydride in the reaction mixture remains essentially constant and does not deviate by more than 10 wt. % from the required level. The reaction mixture is circulated until the desired degree of conversion is obtained. The length of reaction time during which the reaction mixture is pumped over the catalyst in the reactor can be varied within relatively wide limits in the case of copolymers, and depends on the desired copolymer composition. If, for example, a copolymer is desired with a final composition comprising 20 wt. % alkylene oxide, and the concentration of alkylene oxide in the reaction mixture is kept at a constant level of 0.2 wt. % throughout the entire reaction, then a conversion of some 50 wt. % will be obtained after approximately 5 to 10 hours provided the ratio of catalyst volume to reaction mixture circulated per hour is approximately within the range from 1:1 to 1:5. The ratio of the overall volume of reaction components to catalyst volume is between 10:1 and 1:1. The reaction time required is inversely proportional to the alkylene oxide concentration used in the reaction mixture.

It is of advantage if the starting materials THF, substituted tetrahydrofurans, alkylene oxide or carboxylic anhydride are used in as pure a form as possible. This guarantees a long life span for the catalysts. With the catalysts of the invention, tedious purification of tetrahydrofuran with strong mineral acids, organic sulfonic acids, silicates or bleaching earths according to the process described in the European unexamined laid-open application No. 3112 is unnecessary, even if the THF is contaminated with up to 2 wt. % of components containing carbonyl groups, such as esters, aldehydes or ketones. THF of this quality can be obtained, for example, by decarbonylation and subsequent hydrogenation of furfural, or by hydrogenation of maleic anhydride. Different alkylene oxides as well as mixtures of different compounds containing active hydrogen can be used simultaneously in a reaction batch.

The molar ratio of the amount of substituted and/or unsubstituted tetrahydrofurans to the amount of alkylene oxide or carboxylic anhydride used for the reaction is in the range, for example, from 50:1 to 5:1, preferably from 25:1 to 10:1. What is important is that during the addition of alkylene oxide or carboxylic anhydride, care is taken to ensure that the concentration thereof in the reaction mixture is kept below 1 wt. %. It is advisable to keep the molar ratio of the monomers in contact with the catalyst as constant as possible for most of the reaction time, preferably for 80–99% of the total reaction time. Only during the post-reaction time can the concentration of alkylene oxide be allowed to drop to 0 as the last of it reacts. The desirable constancy of the alkylene oxide concentration in the reaction mixture is achieved by adding the alkylene oxide or acid anhydride to the monomer mixture at the same rate as its concentration decreases as a result of polymerization. For copolymerization, the amount of alkylene oxide made to polymerize over the entire reaction period can vary within very wide limits. Copolymers which can be processed to interesting end products contain, for example, 5 to 50, in particular 10 to 30 wt. % alkylene oxide. It is desirable that all of the alkylene oxide or carboxylic anhydride has reacted before the reaction is stopped. Excess unsubstituted and/or substituted tetrahydrofuran, by contrast, which in the absence of alkylene oxide or carboxylic anhydride undergoes no further catalytic reaction, remains in the mixture as a solvent for the copolymer. The polymer concentration in the tetrahydrofuran is, for example, in the range from 20 to 60 wt. %.

It is of advantage if polymerization on the static or agitated catalyst bed is carried out at a temperature in the range from 0 to 70° C., preferably from 30 to 60° C., under standard pressure or under a slightly elevated pressure of up to 3 bar.

According to the preferred procedure, the mixture of starting materials for the polymerization reaction is passed through the reactor, wherein the reaction mixture leaving the reactor being adjusted to the desired concentration—which is kept as constant as possible—by renewed addition of alkylene oxide or acid anhydride. The compound containing reactive hydrogen is usually added at the start of the reaction, its concentration being adjusted relative to the tetrahydrofuran. The compound containing reactive hydrogen can also be added continuously if desired, but this practice is generally avoided. The reaction mixture for the copolymerization reaction, in which the concentration of alkylene oxide is kept as constant as possible throughout the reaction period, is circulated over the fixed-bed catalyst until the quantity of alkylene oxide which the copolymer is later required to contain has been added to the predetermined quantity of tetrahydrofuran. For the homopolymerization of THF, the concentration of carboxylic anhydride is adjusted in the feed mixture in accordance with the desired molecular weight. For the copolymerization of THF and substituted tetrahydrofurans, the concentration of THF and substituted tetrahydrofurans is adjusted in the starting mixture and kept as constant as possible. The concentration of carboxylic anhydride is adjusted in the feed mixture in accordance with the desired molecular weight.

In general, the time needed to complete the reaction is between 2 and 20 hours, preferably between 4 and 10 hours.

The pure polymer is isolated from the reaction product by evaporating off the unreacted tetrahydrofuran, which can be reused for another polymerization.

The polymerization reaction is exothermic. In order to keep the temperature constant it is therefore necessary to cool the reactor itself or else to cool the flow of reaction mixture as it circulates outside the reactor.

The polymerization products obtained, especially those with molecular weights of 200 to 5000, are excellently suited for the production of polyurethanes or polyesters. If carboxylic acids or carboxylic anhydrides are used as initiators for the polymerization, one obtains predominantly esters which, as already mentioned, must be hydrolyzed to glycols before being made to react with diisocyanates or dicarboxylic acids. The final polymer products derived from the polymers have good mechanical properties coupled with good low-temperature resistance and high resistance to microbial attack and saponification. Compared to high-molecular polytetramethylene ether glycol (PTMEG), the copolymers have a lower solidification point and lower viscosity. They can thus be processed further without requiring an additional liquefaction or melting process. This applies in particular to copolymers of tetrahydrofuran, substituted tetrahydrofurans and alkylene oxides, which, due to the lower oxygen content, have the advantage of being less hydrophilic—therefore having a lower tendency to hydrolyze and only little swelling capacity in water—than copolymers of tetrahydrofuran and alkylene oxides.

The method according to the invention has the considerable advantage that practically no byproducts—in particular only very small quantities of cyclic oligomers are formed during the polymerization reaction, and that the reaction can be continued until the alkylene oxide, the carboxylic anhydride and the compound containing reactive hydrogen have been completely used up. Unexpectedly and not easily explained on the basis of experience gathered in the field of polymerization, the polymers synthesized according to the invention have a very narrow molecular weight distribution; for polymers with a molecular weight between 1000 and 1500, for instance, it corresponds to a heterogeneity quotient $M_w/M_n$ in the range from 1.1 to 1.3. By contrast, the polymers obtained from hitherto known continuous and discontinuous processes and having molecular weights between 1000 and 1500 have an average heterogeneity quotient $M_w/M_n$ of between 1.4 and 2.5.

It was likewise unexpected that with the method according to the invention, low-molecular polymers with molecular weights between 200 and 500 can be obtained in two different ways without the need for tedious additional extraction of impurities, essentially cyclic crown ethers, as are described, for example, in the U.S. Pat. No. 4,500,705 and 4,638,097. With the method of the invention, low-molecular homopolymers and copolymers with molecular weights between 200 and 500 can be obtained either directly by adjustment of the concentration of carboxylic anhydride and the concentration of compounds having reactive hydrogen or, preferably, by means of removing the low-molecular fractions from higher-molecular polymers by way of short-path distillation under vacuum, e.g. at a temperature of 250° C. and a pressure of 5 to 0.001 mbar. Both methods yield polymers with a low cyclic-oligomer content of less than 0.8 wt. %. When processed further to polyurethanes, polyesters, and, in particular, to Spandex (elastomeric) fibers, polymers with a narrow molecular weight distribution and a low content of inert, cyclic oligomers are better suited for yielding products with good mechanical properties than are polymers which are extremely heterogeneous in respect of their molecular weight distribution. Another unexpected advantage of the method according to the invention is that copolymers are obtained. which have extremely low color indices. This is unexpected because it is known to persons skilled in the art that polymers obtained by way of cationic polymerization are usually deeply colored and have to be refined using additional measures such as hydrogenation. The polymers have two hydroxyl or ester group equivalents per molecule. Surprisingly, the copolymeric products, too, are almost 100% bifunctional, although it is known that alkylene oxide polymers are mostly not strictly bifunctional. In the PCT application WO 96/23833 a substantially improved method is described involving, among other things, the use of synthetic amorphous aluminum silicates as catalysts. The polymers obtained in this way, especially the copolymers, nevertheless show a significant deviation in excess of 1 to 2% from strict bifunctionality, which means they are of only limited suitability as soft-segment diol components of Spandex fibers. Even without additional refining, the homopolymers and copolymers produced by the method of the invention are well suited for the demanding field of Spandex fibers. Their highly desirable properties result, among other things, from use of the natural catalyst in granular form. Compared to synthetic amorphous aluminum silicate catalysts, the catalyst is highly superior in terms of activity, selectivity, life span and polymer purity. In addition, it is inexpensive.

It is an important advantage of the process that the reaction mixtures, which contain the polymers in concentrations from 40 to 70%, only need to be freed of excess tetrahydrofuran before they are used, for example, in the production of polyurethanes, polyesters or Spandex fibers. The tetrahydrofuran, which is expediently removed by distillation under vacuum, can be reused in the same way and does not need to be purified.

Figure 1:
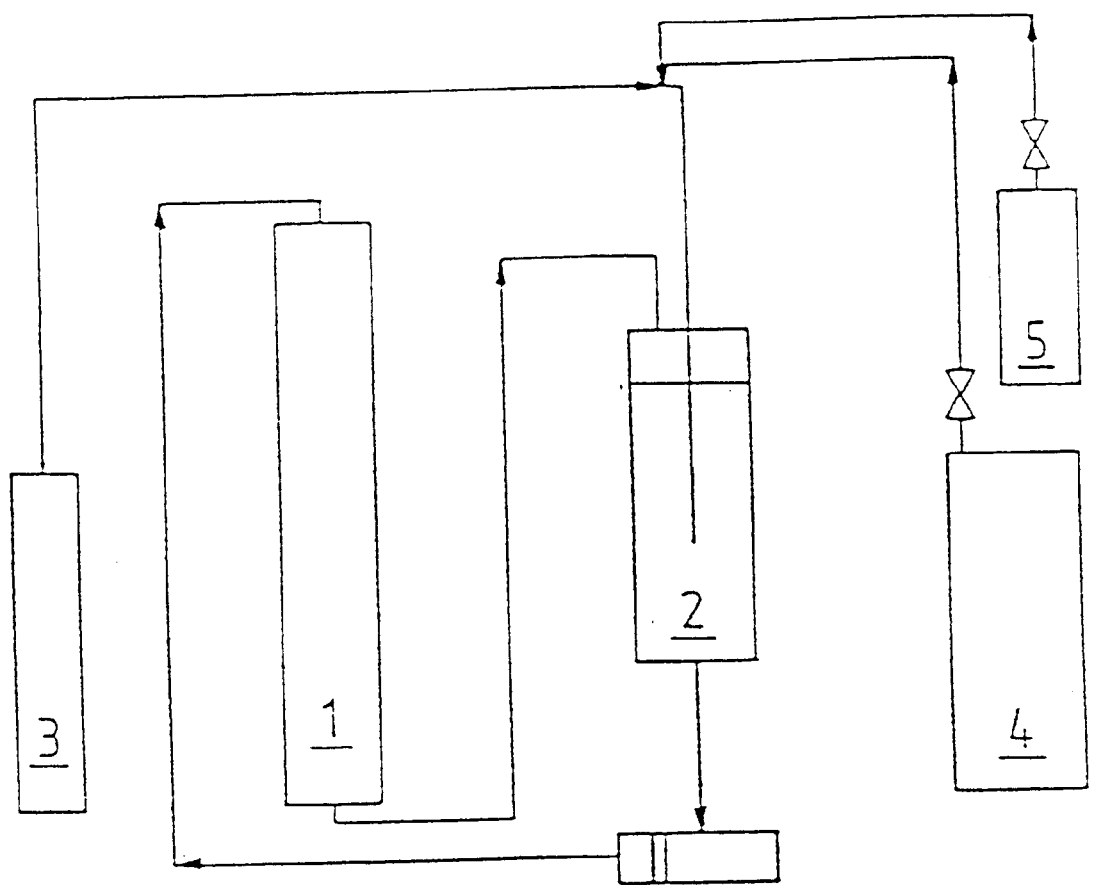
FIG. 1 is a schematic diagram of a reactor setup suitable for carrying out the method of the invention as described in Example 3.

The following examples serve to explain the method of the invention in more detail, without implying any limitations. Parts are parts by weight and bear the same relation to parts by volume as do kilograms to liters.

EXAMPLES

1. Homopolymerization of THF

An anhydrous, amorphous natural aluminum silicate composed of 50% $SiO_2$ and 50% $Al_2O_3$ (supplied by the company J.T. Baker Inc., Phillipsburg, N.J.) was introduced into a Duran glass laboratory flask (from the company Schoff in Mainz, Germany), preheated to 50° C. in a water bath and covered with 300 g of a mixture consisting of 99.5 wt. % THF, with 700 ppm ethyl acetate, and 0.5 wt. % acetic anhydride. The flask, tightly sealed with a polypropylene screw cap, was rotated slowly about its longitudinal axis for 10 hours in the water bath at 50° C. in order to keep the catalyst bed in gentle motion. At hourly intervals, a portion—8 portions altogether—of acetic anhydride was added to the reaction mixture, care being taken to keep the concentration of acetic anhydride below 1 wt. %. The catalyst had already been converted into the protonated form by prior washing with 3% hydrochloric acid and drying at 550° C.

The reaction mixture was then decanted off from the catalyst and analyzed. The reaction product's acid number indicates that at least 99.6% of the acetic anhydride had reacted.

The unreacted THF was evaporated off at 150° C. and 5 mbar from the polytetramethylene ether glycol diacetate that had formed and that was contained in the reaction solution in a concentration of 56% by weight. The diester has a saponification number of 152.6 mg KOH/g, which corresponds to a molecular weight of 734 g/mol. By means of transesterification with the same amount of methanol in the presence of, for example, 0.01 wt. % sodium methylate, PTHF is obtained with a hydroxyl number of 173 mg KOH/g and the color index 4 APHA. The product exhibits a very narrow molecular weight distribution. The heterogeneity quotient (polydispersity) $M_w/M_n$ is only 1.08. The proportion of oligomeric cyclic ethers is less than 0.01 wt. %. Despite the low THF purity, the catalyst has a life span in excess of 3 years.

2. Homopolymerization of THF

A sample of an amorphous clay from the extraction zone 67304 Eisenberg/Pfalz in Germany, which was kindly provided by the company Eisenberger Klebsandwerke GmbH, was washed three times with the five-fold quantity of deionized water, covered with 1% hydrochloric acid, washed neutral, dried, converted to granular form (particle size approximately 3 mm) and calcined at 550° C. for 2 hours until the weight remained constant.

Polymerization is carried out at 50° C. with the same experimental setup as described for Example 1, using the prepared granular catalyst.

For the polymerization altogether 9 g of acetic anhydride, 300 g of THF contaminated with 3 g methyl acetate, and 1 g butyraldehyde were used. After 5 hours of polymerization, more than 99% of the acetic anhydride had reacted, and the polymer solution contained 53 wt. % PTMEG diacetate with the ester number 61.2 (corresponds to a molecular weight of 1824 g/mol). By means of slurry-phase hydrogenation at 220° C. and 250 bar hydrogen on a fixed-bed copper chromite catalyst activated with 11 wt. % barium oxide (supplied by the company Süd-Chemie AG, Munich, Germany), the diacetate, in 60 wt. % methanol solution, was converted into PTMEG with the hydroxyl number 64.1 (molecular weight 1750 g/mol). The polymer, obtained by means of boildown (1 mbar, 190° C.) is very homogeneous and exhibits a heterogeneity $M_w/M_n=1.3$ in GPLC analysis. It has a color index of 4 APHA and an acid number less than 0.01 mg KOH/g.

3. Copolymerization of THF and Ethylene Oxide

Commercial technical-grade tetrahydrofuran was used, without prior purification. The same catalyst was used as in Example 2.

Polymerization was carried out in an apparatus the principle of which is shown in FIG. 1. The dried catalyst was introduced into the reaction tube (1), which was equipped with a thermostatically regulated cooling jacket and had a capacity of 5000 parts by volume and a diameter length ratio of about 1:10. The stock vessel (2), having a useful volume of 7000 parts by volume, was charged with 5000 parts tetrahydrofuran, 43 parts water and 10.3 parts ethylene oxide. The tetrahydrofuran, water and ethylene oxide were taken from their respective storage tanks (4), (5) and (3). This mixture of starting compounds was transferred to the catalyst bed (1), which was kept at a temperature of 47 to 49° C. As soon as the catalyst bed had been filled with fresh feed, the same amount of fresh feed was prepared once again in the stock vessel and then passed continuously over the catalyst bed. The overflow returned to the stock vessel (2). The ethylene oxide concentration in stock vessel (2) was kept constant at 0.1 wt. % by continuously introducing ethylene oxide gas from tank (3) into the feed mixture in the stock vessel (2). An input of 35 parts of ethylene oxide per hour was necessary to maintain this concentration in the feed mixture. After a reaction time of 9 hours, 325 parts of ethylene oxide had been introduced into the reaction mixture. The reaction mixture was then left to post-react at 49° C. For the entire duration of the experiment, the mixture was circulated from the stock vessel (2) over the catalyst (1) at a constant hourly pumping rate of 15000 parts by volume. Thereafter, the ethylene oxide concentration in the feed mixture had dropped to 0 wt. %. The total amount of ethylene oxide introduced and reacted amounted to 315 parts. 5350 parts of reaction mixture were discharged from the stock vessel (2). This first reaction mixture was discarded and the stock vessel (2) then recharged with 5500 parts of fresh feed consisting of 98.3% tetrahydrofuran, 0.7 water and 0.2% ethylene oxide. This mixture was then circulated through the catalyst bed (1) at an hourly pumping rate of 12000 parts by volume. At the same time, 36 parts of ethylene oxide gas were introduced per hour into the reaction vessel (1), as a result of which the ethylene oxide concentration in the stock vessel (2) was kept constant at 0.1%. After 9 hours, the supply of ethylene oxide was cut off. The reaction mixture was circulated for a further four hours at an hourly pumping rate of 12000 parts by volume.

The reaction product in the stock vessel (2) was discharged and the stock vessel recharged as described above with the mixture of tetrahydrofuran, water and ethylene oxide. Polymerization was then carried out as described above for 9 hours, with an additional 4 hours for the post reaction. The reaction mixture thus obtained hardly differed from those obtained in 100 further polymerization batches of this type.

To isolate the copolymer, the colorless reaction mixture (color index <5 APHA) was concentrated by evaporation, first under standard pressure and then under vacuum at a temperature up to 200° C. in a film evaporator. The resulting distillate consisted of 98% pure tetrahydrofuran and of 0.8% low-molecular copolymer with an average molecular weight of about 250. From the amount of copolymer obtained after boildown, it was calculated that 45% of the tetrahydrofuran used had reacted. All of the ethylene oxide used had reacted, being contained quantitatively in a proportion of approximately 15 wt. % in the copolymer. From the hydroxyl number of the copolymer its molecular weight was calculated to be 1260. The heterogeneity, determined by gel permeation chromatography (GPC), of the copolymer was $M_n/M_w$=1.2. The color index was less than 5 APHA and the acid number was below the detectability limit of 0.01 mg KOH/g. Cyclic oligomeric ethers were not detectable in the reaction product.

An almost identical copolymer is obtained when, instead of the acid-activated catalyst, the same catalyst is used but without prior acid activation.

4. Copolymerization of THF, 3-Methyl THF and Propylene Oxide 195 parts of the catalyst used in Example 2 were introduced into a thermostatically regulated reaction vessel equipped with a stirring means. Then the reaction vessel was charged with a mixture of 900 parts tetrahydrofuran, 50 parts 3-methyl tetrahydrofuran and 40 parts formic acid. To this mixture, which was stirred constantly, 10 parts of propylene oxide per hour were then added at a uniform rate over a period of five hours. In this way, the propylene oxide concentration in the reaction mixture was kept constant at 0.08 wt. %. The reaction temperature was 50 C. After all the propylene oxide had been added, the reaction mixture was stirred for another four hours at reaction temperature. The resulting copolymer solution was separated from the catalyst by filtering. The filtrate was free of propylene oxide and consisted of 43% copolymer, 53% unreacted tetrahydrofuran and 4% 3-methyl tetrahydrofuran, as was determined by boildown under standard pressure and under vacuum. The solvent-free copolymer had a saponification number of 37 mg KOH/g and a hydroxyl number of 13 mg KOH/g. The product contained less than 0.3% cyclic oligomeric ethers. The ester-containing polymer was then mixed with an equal volume of methanol and, after addition of 10 parts of calcium hydroxide, was transesterified to glycol under standard pressure at 32° C. by distillation on a column with 20 theoretical trays, the methyl formate ester being distilled off. When the transesterification to glycol was complete, the calcium hydroxide used as transesterification catalyst was filtered off and the methanolic solution of the copolymer was boiled down completely—first under standard pressure and later under vacuum—using a film evaporater. The polymer obtained was pure, ester-free glycol and had a hydroxyl number of 51 mg KOH/g, which corresponds to a molecular weight of 2210. The $^{13}C$ NMR spectrum showed that the copolymer had been formed from approximately 10% propylene oxide, 87% tetrahydrofuran and 3% methyl tetrahydrofuran. The product's dispersity $M_w/M_n$ was 1.25. Its color index was below 5 APHA and the acid number less than 0.01 mg KOH/g.

What is claimed is:

1. A method for discontinuously or continuously producing diesters of polytetramethylene ether glycol by polymerization of tetrahydrofuran and/or substituted tetrahydrofurans in the presence of carboxylic acid anhydride and a catalyst, wherein the catalyst is a non-acidified and calcined natural amorphous aluminum silicate catalyst, and the carboxylic acid anhydride is added to the reaction mixture in such a manner that its concentration therein is kept below 1 wt. % during polymerization.

2. The method of claim 1,
   wherein
   the concentration of carboxylic acid anhydride is kept essentially constant.

3. The method of claim 1,
   wherein
   the diester is converted into the glycol form.

4. The method according to claim 1,
   wherein
   the overall quantity of carboxylic acid anhydride introduced into the reaction is 0.1 to 50 mol percent relative to tetrahydrofuran.

5. The method of claim 3,
   wherein
   the overall quantity of carboxylic acid anhydride introduced into the reaction is 0.5 to 20 mol percent relative to the tetrahydrofuran.

6. A method for discontinuously or continuously producing derivatives of polyoxybutylen oxy-polyalkylene glycol by copolymerization of tetrahydrofuran and/or substituted tetrahydrofurans with alkylene oxides in the presence of compounds containing reactive hydrogen and of a catalyst, wherein the catalyst is a non-acidified and calcined natural amorphous aluminum silicate catalyst, and the alkylene oxide is added to the reaction mixture in such a manner that its concentration therein is kept below 1 wt. % during polymerization.

7. The method of claim 6,
   wherein
   the concentration of alkylene oxide is kept essentially constant.

8. The method of claim 6,
   wherein
   the derivative is converted into the glycol form.

9. The method according to claim 6, wherein the alkylene oxide is at least one alkylene oxide selected from the group consisting of ethylene oxide and 1,2-propylene oxide.

10. The method according to claim 6,
    wherein
    the compound containing reactive hydrogen is water.

11. The method according to claim 6,
    wherein
    the compound containing reactive hydrogen is at least one aliphatic and/or aromatic carboxylic acid having 1 to 12 carbon atoms.

12. The method according to claim 6,
    wherein
    the molar ratio of the tetrahydrofuran used in the reaction with respect to the total amount of alkylene oxide introduced into the reaction is between 50:1 and 1:1.

13. The method according to claim 6,
    wherein
    the total amount of the compound containing reactive hydrogen used in the reaction is 0.01 to 10 mol % relative to the tetrahydrofuran.

14. The method according to claim 1,
wherein
the substituted tetrahydrofuran is at least a tetrahydrofuran substituted in the 2- and/or 3-position.

15. The method according to claim 1,
wherein
the substituted tetrahydrofuran is 3-methyl tetrahydrofuran.

16. The method according to claim 1,
wherein
polymerization is carried out at a reaction temperature of 0 to 70° C.

17. The method according to claim 6, wherein the substituted tetrahydrofuran is 3-methyl tetrahydrofuran.

18. The method according to claim 6, wherein polymerization is carried out on a fixed-bed catalyst comprising molded particles with a mean diameter of 0.5 to 10 mm.

19. The method according to claim 18, wherein polymerization is carried out on a fixed-bed catalyst comprising molded particles with a mean diameter of 1 to 8 mm.

20. The method according to claim 6, wherein the substituted tetrahydrofuran is substituted in at least one of the 2-position and the 3-position.

21. The method according to claim 1, wherein polymerization is carried out on a fixed-bed catalyst comprising molded particles with a mean diameter of 0.5 to 10 mm.

22. The method according to claim 21, wherein polymerization is carried out on a fixed-bed catalyst comprising molded particles with a mean diameter of 1 to 8 mm.

* * * * *